United States Patent
Fudge et al.

(10) Patent No.: US 7,496,158 B2
(45) Date of Patent: Feb. 24, 2009

(54) SWEPT BANDPASS FILTER FREQUENCY MODULATED CONTINUOUS WAVE (FMCW) RECEIVER AND RELATED METHOD

(75) Inventors: Gerald L. Fudge, Rockwall, TX (US); Boyd E. Gallatin, Plano, TX (US)

(73) Assignee: L-3 Communications Integrated Systems L.P., Greenville, TX (US)

( * ) Notice: Subject to any disclaimer, the term of this patent is extended or adjusted under 35 U.S.C. 154(b) by 534 days.

(21) Appl. No.: 11/247,314

(22) Filed: Oct. 11, 2005

(65) Prior Publication Data

US 2007/0081611 A1 Apr. 12, 2007

(51) Int. Cl.
*H03K 9/00* (2006.01)
*H04L 27/00* (2006.01)

(52) U.S. Cl. ....................... 375/340; 375/355
(58) Field of Classification Search ................. 375/316, 375/340, 354, 355
See application file for complete search history.

(56) References Cited

U.S. PATENT DOCUMENTS

| | | | |
|---|---|---|---|
| 5,014,018 A | 5/1991 | Rodwell et al. ............... 333/20 |
| 5,349,700 A * | 9/1994 | Parker ..................... 455/193.2 |
| 5,454,007 A | 9/1995 | Dutta ......................... 375/78 |
| 6,266,518 B1 | 7/2001 | Sorrells et al. ............. 455/118 |
| 6,507,624 B1 | 1/2003 | Jachim et al. ............... 375/316 |
| 6,574,459 B1 | 6/2003 | Kaminski et al. .......... 455/272 |
| 6,700,388 B1 | 3/2004 | Mayor et al. ................ 324/537 |
| 6,900,710 B2 | 5/2005 | Agoston et al. ............. 333/248 |
| 7,107,033 B2 | 9/2006 | du Toit ....................... 455/296 |
| 2002/0161300 A1 | 10/2002 | Hoff et al. ................... 600/449 |
| 2003/0016762 A1 | 1/2003 | Martin et al. ............... 375/308 |
| 2003/0054783 A1 | 3/2003 | Mason et al. ............... 455/307 |
| 2004/0142701 A1* | 7/2004 | Abraham ................. 455/456.1 |
| 2005/0069046 A1 | 3/2005 | Tsui et al. ................... 375/260 |

OTHER PUBLICATIONS

Arthur, "Modern SAW-based pulse compression systems for radar applications, Part I: SAW matched filters," Electronics & Communication Engineering Journal, Dec. 1995, pp. 236-246.
Arthur, "Modern SAW-based pulse compression systems for radar applications, Part II: Practical systems," Electronics & Communication Engineering Journal, Apr. 1996, pp. 57-78.
Brandl et al., "High Speed Signal Processing with Tapped Dispersive SAW based Delay Lines," University of Technology, Applied Electronics Laboratory, Vienna Austria, IEEE 2000, pp. 171-176.
Burke, "Ultra-Linear Chirp Generation Via VCO Tuning Predistortion," AIL Systems, Inc., Deer Park, New York, IEEE 1994 MTT-S Digest, pp. 957-960.

(Continued)

*Primary Examiner*—David B Lugo
(74) *Attorney, Agent, or Firm*—O'Keefe, Egan, Peterman & Enders, LLP

(57) ABSTRACT

A swept bandpass filter for receiving frequency varying input signals is disclosed. More particularly, a swept bandpass filter frequency modulated continuous wave (FMCW) receiver and related method are disclosed that provide an efficient solution for FMCW signals. The swept bandpass architecture eliminates the need for front-end mixing circuitry and allows for sampling across one or more Nyquist zones within the swept frequency band.

26 Claims, 4 Drawing Sheets

OTHER PUBLICATIONS

Gerard et al., "The Design and Applications of Highly Dispersive Acoustic Surface-Wave Filters," Invited Paper, IEEE Transactions on Microwave Theory and Techniques, vol. MTT-21, No. 4, Apr. 1973, pp. 176-186.

Ong et al., "Digital LPI Radar Detector," Naval Postgraduate School Thesis, Monterey, California, Mar. 2001, pp. 1-81.

Grant et al., "Recent Advances in Analog Signal Processing," IEEE 1990, IEEE Transactions on Aerospace and Electronic Systems, vol. 26, No. 5, Sep. 1990, pp. 818-849.

Li et al, "On the Use of a Compressive Receiver for Signal Detection," IEEE 1991, IEEE Transactions on Communications, vol. 39, No. 4, Apr. 1991, pp. 557-566.

Levy et al, "VCO Based Chirp Generation for Broad Bandwidth Compressive Receiver Applications," AIL Systems, Inc., Deer Park, New York, IEEE 1993 MTT-S Digest, pp. 1113-1115.

Lucyszyn, "Review of radio frequency microelectromechanical systems technology," Imperial College, London, IEE Proc.-Sci. Meas. Technol. vol. 151, No. 2, Mar. 2004, pp. 93-103.

Lyons et al., "High Temperature Superconductive Wideband Compressive Receivers," Analog Device Technology Group, Lincoln Laboratory, Invited Paper, IEEE Transactions on Microwave Theory and Techniques, vol. 44, No. 7, Jul. 1996, pp. 1258-1278.

Unser, "Sampling—50 Years After Shannon," Swiss Federal Institute of Technology, Lausanne, Switzerland, IEEE 2000 Proceedings of the IEEE, vol. 88, No. 4, Apr. 2000, pp. 569-587.

Sengupta et al, "Novel Ferroelectric Materials for Phased Array Antennas," U.S. Army Research Laboratory, Aberdeen Proving Groud, 1997 IEEE, IEEE Transactions on Ultrasonics, Ferroelectrics, and Frequency Control, vol. 44, No. 4, Jul. 1997, pp. 792-797.

Serhan et al., "Automatic Frequency Control Techniques For Microwave Active Filters," Limoges University, Limoges, France, 1997 IEEE MTT -S Digest, pp. 697-700.

Whittaker et al, "Digital chirp filter processing for improved performance of sweeping spectrum analysers," University of Surrey, Surrey, UK, Electronics Letters, Aug. 3, 2000, vol. 36, No. 16, pp. 1430-1432.

Agoston et al, "100 GHz Through-Line Sampler System with Sampling Rates in Excess of 10 G samples/second," Picosecond Pulse Labs, Boulder, Colorado, PSPL-100 Sampler Paper—Submitted to MTT 2003, http://www.picosecond.com->products->sampler modules, 3 pgs.

Akbari-Dilmaghani et al, "A High Q RF CMOS Differential Active Inductor," Imperial College, London, 1998 IEEE International Conference on Electronics, Circuits and Systems, vol. 3, Sep. 7-10, 1998, pp. 157-160.

Akos et al, "Direct Bandpass Sampling of Multiple Distinct RF Signals," 1999 IEEE Transactions on Communications, Vo. 47, No. 7, Jul. 1999, pp. 983-988.

Behbahani et al, "A Broad-Band Tunable CMOS Channel-Select Filter for a Low-IF Wireless Receiver," 2000 IEEE Journal of Solid-State Circuits, vol. 35, No. 4, Apr. 2000, pp. 476-489.

Brown et al, "Digital L-Band Receiver Architecture with Direct RF Sampling," NAVSYS Corp., Colorado Springs, Colorado, Position Location and Navigation Symposium, 1994, IEEE, Apr. 11-15, 1994, pp. 209-216.

Copeland et al, "5-GHz SiGe HBT Monolithic Radio Transceiver with Tunable Filtering," 2000 IEEE Transactions on Microwave Theory and Techniques, vol. 48, No. 2, Feb. 2000, pp. 170-181.

Deleniv et al, "Tunable Ferroelectric Filter-Phase Shifter," University of Technology, Gothenburg, Sweden, 2003 IEEE MTT-S Digest, pp. 1267-1270.

Juodawlkis et al, "Optical Down-Sampling of Wide-Band Microwave Signals," Invited Paper, Journal of Lightwave Technology, vol. 21, No. 12, Dec. 2003, pp. 3116-3124.

Karvonen et al, "A CMOS Quadrature Charge-Domain Sampling Circuit with 66-dB SFDR Up to 100 MHz," 2005 IEEE Transactions on Circuits and Systems -I: Regular Papers, vol. 52, No. 2, Feb. 2005, pp. 292-304.

Koc et al, "Direct RF Sampling Continuous-Time Bandpass /spl Delta/-/spl Sigma/A/D Converter Design for 3G Wireless Applications," ISCAS 2004, May 23-26, 2004, vol. 1, pp. 409-412.

Latiri et al, "A reconfigurable RF sampling receiver for multistandard applications," Comptes Rendus Physique 7 (2006), pp. 785-793.

Lindfors et al, "A 3-V 230- MHz CMOS Decimation Subsampler," 2003 IEEE Transactions on Circuits and Systems—II: Analog and Digital Signal Processing, vol. 50. No. 3, Mar. 2003, pp. 105-117.

Tatu et al, "Ka-Band Direct Digital Receiver," 2002 IEEE Transactions on Microwave Theory and Techniques, vol. 50, No. 11, Nov. 2002, pp. 2436-2442.

Tayebati et al, "Microelectromechanical tuneable filters with 0.47 nm linewidth and 70nm tuning range," Electronics Letters, Jan. 8, 1998, vol. 34, No. 1, pp. 76-78.

Thor et al, "A Direct RF Sampling Multifrequency GPS Receiver," Stanford University, Position Location and Navigation Symposium, 2002 IEEE, Apr. 15-18, 2002, pp. 44-51.

Tsui et al, "Digital Microwave Receiver Technology," Invited Paper, 2002 IEEE Transactions on Microwave Theory and Techniques, vol. 50, No. 3, Mar. 2002, pp. 699-705.

Valkama et al., "Advanced Receiver Architectures and I/Q Signal Processing," Tampere University of Technology, Tampere, Finland, First International Symposium on Control, Communications and Signal Processing, IEEE Jun. 2004, pp. 71-74.

Vaughan et al, "The Theory of Bandpass Sampling," 1991 IEEE Transactions on Signal Processing, vol. 39, No. 9, Sep. 1991, pp. 1973-1984.

Wooten et al, "Rapidly Tunable Narrowband Wavelength Filter Using LiNbO3 Unbalanced Mach-Zehnder Interferometers," Journal of Lightwave Technology, vol. 14, No. 11, Nov. 1996, pp. 2530-2536.

Pepper et al, "NLTLs Push Sampler Products Past 100 GHz," Microwaves & RF, Oct. 2005, 6 pgs.

Model 7620 DCSM VME Card Datasheet, Revision C, Picosecond Pulse Labs, Boulder, Colorado, Sep. 2005, 10 pgs.

Wepman, "Analog—to- Digital Converters and Their Applications in Radio Receivers," 1995 IEEE Communications Magazine, May 1995, pp. 39-45.

U.S. Appl. No. 60/373,163, filed Apr. 17, 2002, "Tunable modules for frequency agile receivers."

Loper, "A Tri-Phase Direct Conversion Receiver," Rockwell International, MILCOM 1990, Sep. 30-Oct. 3, 1990, pp. 1228-1232.

Luy et al, "Configurable RF Receiver Architecture," Daimler-Chrysler Research and Technology, Ulm, Germany, 2004 IEEE Microwave Magazine, Mar. 2004, pp. 75-82.

Minnis et al, "A Highly Digitized Multimode Receiver Architecture for 3G Mobiles," 2003 IEEE Transactions on Vehicular Technology, vol. 52, No. 3, May 2003, pp. 637-653.

Mirabbasi et al, "Classical and Modern Receiver Architectures," University of Toronto, 2000 IEEE Communications Magazine, Nov. 2000, pp. 132-139.

Mostafa et al, "WCDMA Receiver Architecture with Unique Frequency Plan," Micro Lnear Corp. San Jose, California and Texas Instruments, Inc., Dallas, Texas, ASIC/SOC Conference, 2001 Proceedings, 14th Annual IEEE International, Sep. 12-15, 2001, pp. 57-61.

Muhammad et al, "Direct RF Sampling Mixer With Recursive Filtering in Charge Domain," Texas Instruments Incorporated, Dallas, Texas, ISCAS, May 23-26, 2004, vol. 1, pp. 577-580.

Namgoong et al., "Direct-Conversion RF Receiver Design," 2001 IEEE Transactions on Communications, vol. 49, No. 3, Mar. 2001, pp. 518-529.

Pellon, "RF-to-Digital Receivers Employing Bandpass Multibit /spl Sigma//spl Delta/ ADC Architectures," Lockheed Martin Government Electronic Systems, Morristown, New Jersey, 20th Annual Gallium Arsenide Integrated Circuit (GaAs IC) Symposium, Nov. 1-4, 1998, pp. 11-14.

"Real-Time Sampling Downconverter Front Ends for Digital Radar and Wide-Bank Signaling," Picoscond Pulse Labs, 2500 55th Street, Boulder, CO 80301, (Nov. 2004).

Richter et al, "An Integrated Wideband-IF-Receiver Architecture for Mobile Terminals," Dresden University of Technology, Dresden, Germany, 2003 IEEE Radio Frequency Integrated Circuits Symposium, Jun. 8-10, 2003, pp. 583-586.

Shoji et al, "70-GHz-Band MMIC Transceiver With Integrated Antenna Diversity System: Application of Receive-Module-Arrayed Self-Heterodyne Technique," 2004 IEEE Transactions on Microwave Theory and Techniques, vol. 52, No. 11, Nov. 2004, pp. 2541-2549.

Springer et al, "RF System Concepts for Highly Integrated RFICs for W-CDMA Mobile Radio Terminals," 2002 IEEE Transactions on Microwave Theory and Techniques, vol. 50, No. 1, Jan. 2002, pp. 254-267.

PCT International Search Report, PCT/US2006/039615, Apr. 2, 2007.

PCT International Application No. PCT/US06/39506, "*International Search Report,*" filed Oct. 10, 2006.

* cited by examiner

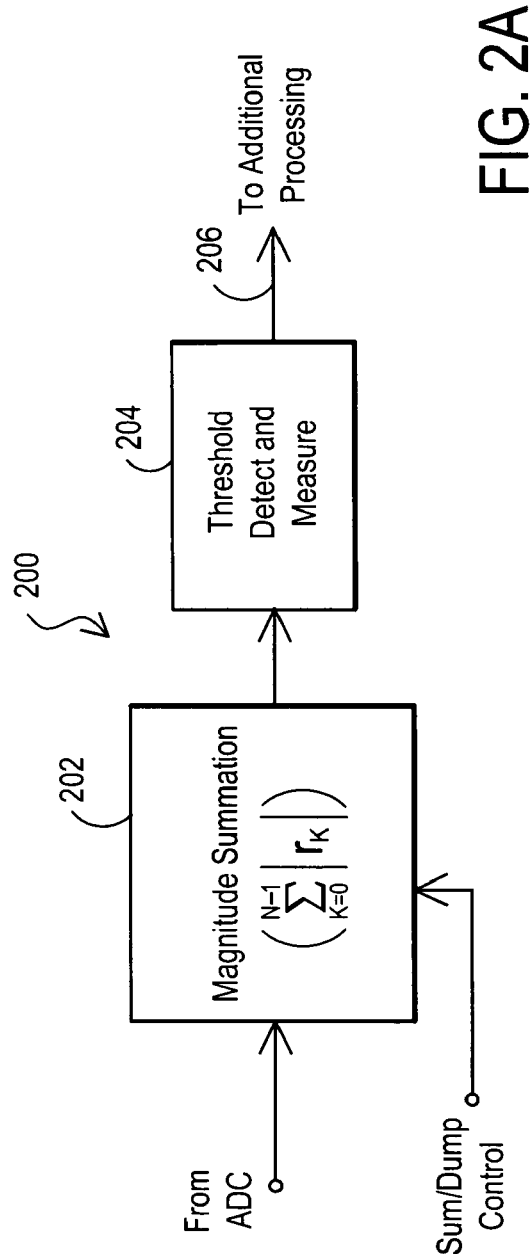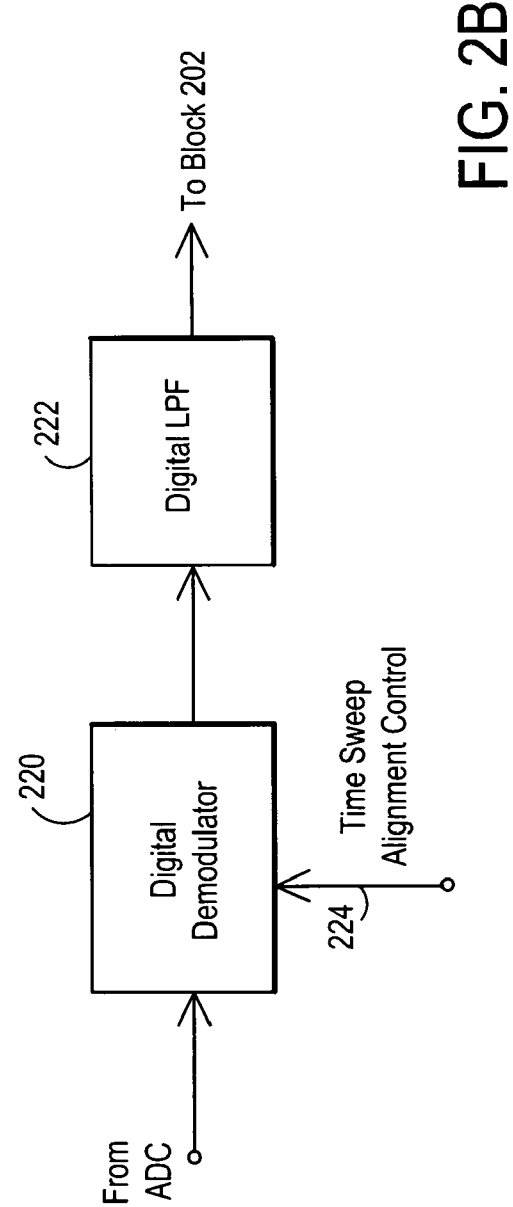

SWEPT BANDPASS FILTER FREQUENCY MODULATED CONTINUOUS WAVE (FMCW) RECEIVER AND RELATED METHOD

RELATED APPLICATIONS

This subject matter of this Application is related in part to the subject matter described in concurrently filed application Ser. No. 11/247,338, entitled "RECONFIGURABLE DIRECT-RF BANDPASS SAMPLING RECEIVER AND RELATED METHODS," which is hereby expressly incorporated by reference in its entirety.

TECHNICAL FIELD OF THE INVENTION

This invention relates to receiver architectures for detection of radio frequency (RF) signals and, more particularly, to receiver architectures for the detection of frequency modulated signals.

BACKGROUND

A wide range of signals and related protocols exist for the use of radio frequency signals in communication systems and other devices, such as radar systems. In some applications, it is desirable to determine or confirm the existence of RF signals, including such signals that may be frequency modulated. A frequency modulated continuous wave (FMCW) receiver is one type of receiver that is configured to identify and receive frequency modulated signals. An FMCW signal ($RF_{FMCW}$) for example, may be transmitted by a radar system that is using frequency modulated signals for its operation, and these frequency modulated signals may occur across a wide frequency range. An FMCW receiver designed to detect such signals, therefore, must be capable of tracking the signal across the full range of the desired frequency band as the input signal is modulated.

Prior approaches to building a wide bandwidth FMCW receiver fall into four broad categories: analog mixer based receivers, fixed analog compressive filter receivers, analog convolver based receivers, and wideband digital receivers. Slight variations in architecture and implementation exist within each category, but the basic principles of operation and design remain the same.

FIG. 6 (Prior Art) is a block diagram for a prior FMCW architecture 600 that utilizes a mixer 602 and sweep control of the voltage control oscillator (VCO) 604 that provides the local oscillator (LO) mixing signal. As depicted, sweep control block 606 provides one or more control signals to an oscillator, such as VCO 604, to control the LO mixing signal output by the VCO 604 to the mixer 602. The mixer 602 mixes the incoming RF signals, such as an FMCW signal, with the mixing signal and outputs a resulting signal at a fixed intermediate frequency (IF). Next, a fixed narrow band filter 608 at an IF frequency filters the signal and provides the filtered signal to a narrow band analog-to-digital converter (ADC) 610. The ADC 610 outputs digital signals to the digital signal processor (DSP) block 612. The DSP block 612 then processes the digital signals to determine if a signal has been detected or confirmed. Problems with this prior approach include interference and spurs caused by the mixing process as well as signal-to-noise (SNR) problems.

This mixer-based architecture for a wide bandwidth FMCW receiver, therefore, uses a mixer to translate the wideband FMCW signal to an intermediate frequency (IF). At the intermediate frequency (IF), a fixed filter is used to separate the translated FMCW signal from background noise and interference, and in the case of digital processing, the fixed filter may be used to avoid aliasing. Following the fixed filter, energy detection can be performed. Various technologies for generating the mixing signal are possible, including the voltage controlled oscillator (VCO) shown in FIG. 6 (Prior Art), impulse excitation of a fixed compressive filter, direct digital synthesis, and acoustic charge transport techniques. Regardless of the technology used, however, the basic principles of this architecture are the same. The frequency of the input signal is matched by the sweep control driving the VCO. Detection can be performed at either IF or baseband using analog or digital techniques. Disadvantages of these techniques include spurs and phase noise introduced by the mixer. In addition, apriori information is required because the mixer tuning must approximately match the signal frequency at each instant in time in order to keep the tuned result within the fixed filter bandwidth.

Another prior architecture is a compressive filter architecture. Such an architecture may be based on using an analog matched filter whose impulse response is the time reversal of the desired signal to be received. Thus, when the desired signal is received, the output of the compressive filter is an impulse. The primary advantage of the compressive filter is that it forms the optimum receiver for the particular waveform of interest with maximum processing gain. Because the compressive filter is analog, far less power is required for wideband applications than an all digital approach. The compressive filter uses tapped delay lines (or the mathematical equivalent) to achieve the appropriate dispersion and may be implemented via various technologies, including surface acoustic wave (SAW) filters, superconductive electromagnetic material tapped delay lines, charge-coupled devices (CCDs), and optical/acousto-optic devices. Each of these technologies, however, has its disadvantages, especially when applied to typical electronic warfare (EW) applications. In general, CCDs do not have enough bandwidth for the typical EW applications. SAW filters can provide greater bandwidth than CCDs with very small form factor, but are limited in SNR (signal-to-noise ratio) and spurious dynamic range. Acousto-optic devices can also allow a small form factor receiver system, but they also have limited dynamic range. Superconductive tapped delay line techniques can provide extremely wide bandwidths, but typically suffer from very limited spurious dynamic range and the need for some form of cryogenic cooling. Another problem with the wider bandwidth devices is that they have limited programmability when used in a compressive receiver architecture since any given device is not able to produce impulse responses matching the time reversal of a wide range of frequency modulated signals.

Another prior architecture is a convolutional matched filter receiver. The optimum matched filter can also be achieved by a convolutional receiver that uses an analog convolver and a waveform synthesizer to convolve the desired signal with a time reversed replica. Thus, like the compressive receiver, the convolutional matched filter receiver produces an impulse output when the desired signal is received. This architecture is more flexible than the compressive receiver architecture, because the received signal structure is not fixed in the receiver implementation but is a synthesizable input to the convolver. Therefore, the convolutional matched filter receiver can provide optimum processing gain against a wide variety of input waveforms. The cost for this flexibility is the complexity of the RF waveform synthesizer. In addition, this architecture suffers from the device technology used in the analog convolver. SAW devices are typically used in convolutional matched filter receivers. These convolutional devices have limited dynamic range and bandwidth.

Still another prior architecture is a wideband digital receiver architecture. This architecture uses an IF bandpass filter with large bandwidth followed by a wideband high speed ADC. The matched filtering can then be performed digitally using a variety of techniques. Advantages of wideband digital receivers include flexibility, the ability to perform matched filtering against different signals simultaneously in the same receiver, and the ability to capture wide instantaneous bandwidth signals. Disadvantages include the limited dynamic range (decreased SNR and spurious-free dynamic range) of high speed ADCs compared to slower ADCs, as well as the higher power consumption required by the ADC and the processing of the high-speed digital data.

In short, these prior architectures fall short of providing an efficient solution for detecting wideband frequency-modulated, time-varying signals.

SUMMARY OF THE INVENTION

The present invention provides a swept bandpass filter for receiving frequency varying input signals. More particularly, the present invention is a swept bandpass filter frequency modulated continuous wave (FMCW) receiver and related method that provide an efficient solution for FMCW signals. The swept bandpass architecture eliminates the need for front-end mixing circuitry and allows for sampling across multiple Nyquist zones within the swept frequency band.

In one embodiment, the present invention is receive path circuitry for a receiver configured to receive frequency modulated signals including a bandpass filter having a center frequency that is sweepable across a frequency band and having a sweep control signal as an input that is configured to determine a location of the center frequency within the frequency band and filter sweep control circuitry coupled to the bandpass filter to provide the sweep control signal where the filter sweep control circuitry is configured to control the sweep control signal to cause the center frequency of the bandpass filter to be swept across the frequency band. In addition, the receive path circuitry can include an analog-to-digital converter (ADC) coupled to sample an output from the sweepable bandpass filter at a sampling frequency that is dependent upon a sampling clock input to the ADC. The bandwidth for the sweepable bandpass filter can be less than a bandwidth for the frequency band. Thus instead of selecting the sampling frequency based on baseband Nyquist sampling criteria or bandpass Nyquist sampling criteria with respect to the total swept bandwidth, the sampling frequency can be selected such that one or more Nyquist zones are crossed as the bandpass filter is swept across the frequency band. Still further, the receive path circuitry can include signal processing circuitry configured to further process the digital signals received from the ADC. Also, the filter sweep control circuitry can include error detection circuitry configured to determine a difference between an actual frequency for a received signal and an expected frequency for a received signal. In addition, the sweepable bandpass filter is configured to have an adjustable bandwidth that is controlled by a bandwidth control signal, and the filter sweep control circuitry can be configured to sweep the center frequency for the sweepable bandpass filter to track characteristics for a desired signal to be detected. The desired signal can be, for example, a frequency modulated radar signal, a signal not known to exist and its existence is being detected, and/or a signal known to exist and its existence is being confirmed. As described below, other features and variations can be implemented, if desired, and related methods can be utilized, as well.

In another embodiment, the present invention is a method for receiving frequency modulated signals including receiving a input signal having a frequency that varies within a frequency band, determining a location for the input signal frequency as a function of time, sweeping the center frequency of a sweepable bandpass filter across the frequency band based upon the frequency location of the input signal, and filtering the input signal with the sweepable bandpass filter. The method can include digitizing the filtered signal from the swept bandpass filter at a sampling frequency, and conducting additional digital signal processing on the digitized signals. In addition, the bandwidth for the sweepable bandpass filter can be less than a bandwidth for the frequency band. Thus, instead of selecting the sampling frequency based on baseband Nyquist sampling criteria or bandpass Nyquist sampling criteria with respect to the total swept bandwidth, the sampling frequency can be selected such that one or more Nyquist zones are crossed as the bandpass filter is swept across the frequency band. Still further, the method can further include determining a tracking error to help control the sweeping of the center frequency for the sweepable bandpass filter, adjusting the bandwidth of the sweepable bandpass filter, adjusting the sampling frequency, and sweeping the center frequency for the sweepable bandpass filter to track characteristics for a desired signal to be detected.

DESCRIPTION OF THE DRAWINGS

It is noted that the appended drawings illustrate only exemplary embodiments of the invention and are, therefore, not to be considered limiting of its scope, for the invention may admit to other equally effective embodiments.

FIG. 2A is a block diagram for an embodiment of detection circuitry for a swept bandpass filter FMCW receiver.

FIG. 2B is a block diagram of an embodiment for additional circuitry that could be utilized with the detection circuitry of FIG. 2A.

DETAILED DESCRIPTION OF THE INVENTION

Figure 1:
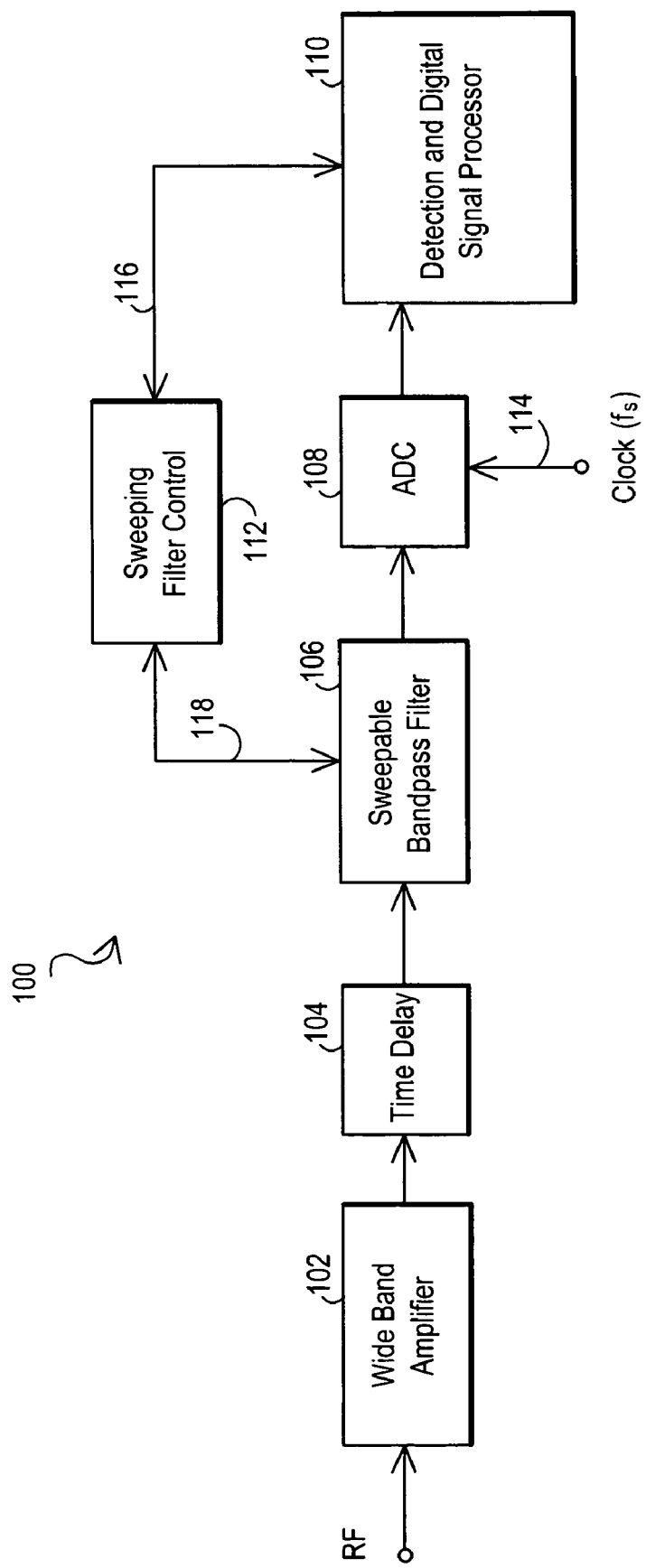
FIG. 1 is a block diagram of an embodiment for a swept bandpass filter frequency modulated continuous wave (FMCW) receiver.

The present invention provides a swept bandpass filter for receiving frequency varying input signals. More particularly, the present invention provides a swept bandpass filter (SBPF) frequency modulated continuous wave (FMCW) receiver and related method that provide an efficient solution for FMCW signals. The swept bandpass architecture eliminates the need for front-end mixing circuitry and allows for sampling across multiple Nyquist zones within the swept frequency band.

In one embodiment, the present invention is a swept bandpass filter (SBPF) frequency modulated continuous wave (FMCW) receiver (denoted herein as swept BPF FMCW receiver or SBPF-FMCW receiver) that utilizes a time-varying frequency modulated bandpass filter followed by an analog-to-digital converter (ADC) with sampling across one or more Nyquist zones in order to form an approximately matched filter for a frequency modulated signal. Applications for this SBPF-FMCW receiver include electronic warfare (EW) receivers which need to be adaptable to a large variety of frequency modulated signals including signals with large total bandwidth, high time-bandwidth product, and narrow instantaneous bandwidth.

If desired, a number of new technologies can be utilized in implementing a programmable swept BPF such as that used in the SBPF-FMCW receiver according to the present invention. These technologies include programmable SAW filters, frequency control techniques for active microwave filters, voltage-controlled dielectric materials, and reconfigurable micro-electro-mechanical systems (MEMS) technology. These various technologies allow the construction of a tuneable analog bandpass filter with very low power consumption. With suitable control logic, the tuneable analog bandpass filter can be swept (or stepped in an approximation of a continuous sweep) across a large range of frequencies in a variety of chirp patterns such as sawtooth, triangle, sinusoidal, etc. This in turn means that a matched filter for a FMCW signal can be made using this swept analog bandpass filter. It is also noted that a combination of switched and tunable filters may be also used to achieve the total frequency modulation of the time-varying bandpass filter.

The SBPF-FMCW receiver of the present invention provides advantages over prior solutions. Compared to prior compressive receiver solutions, the SBPF-FMCW receiver of the present invention, while providing less processing gain than a matched compressive receiver, can handle a wider range of signals, including wideband linear or nonlinear continuous wave frequency chirps, narrow band communications signals, and pulsed radar. In addition, the SBPF-FMCW receiver can process a signal with arbitrary time-bandwidth product, while all compressive receivers can process only a limited range of time bandwidth products (with the time-bandwidth product partially determined by the particular device technology used). In the case of the SBPF-FMCW receiver, the time bandwidth product depends on the sweep pattern and the time duration of the sweeping. Although the sweep speed and frequency range may be constrained by the particular filter technology used in the SBPF-FMCW receiver, the time duration is arbitrary. In addition, compared to mixer based solutions, by avoiding a mixer in the SBPF-FMCW receiver, the phase noise and spur contributions are significantly reduced or eliminated. And unlike analog convolver solutions where the analog convolver is limited in time-bandwidth product, the SBPF-FMCW receiver can achieve an arbitrarily long time-bandwidth product as discussed earlier. In addition, by using a relatively slow ADC, the SBPF-FMCW receiver of the present invention can achieve higher dynamic range at lower power consumption than a wideband digital receiver.

FIG. 1 is a block diagram of an embodiment 100 for a swept bandpass filter frequency modulated continuous wave (FMCW) receiver. A sweepable bandpass filter 106 receives one or more control signals from filter control circuitry 112. These control signals determine operational parameters for the sweepable bandpass filter and can be used to control the sweep of the center frequency for the sweepable bandpass filter 106 across a frequency band. These control signals may also control other filter parameters such as the filter bandwidth, which can be configured to be adjustable based upon a bandwidth control signal from the filter control circuitry 112. As depicted, the filtered signal from sweepable bandpass filter 106 then passes to an ADC 108 that outputs a digital signal to detection and digital signal processor (DSP) block 110. The ADC 108 samples the filtered signal at sample intervals determined by the sampling clock signal (CLOCK) 114 that has a selected sampling frequency ($f_S$). Signal line 116 represents the signals communicated between the filter control circuitry 112 and the detection and DSP circuitry 110. Signal line 118 represents the signals communicated between the sweepable bandpass filter 106 and the filter control circuitry 112. The sweepable bandpass filter 106 can receive the input RF signal, such as an FMCW signal, or, if desired, the incoming RF signal can first be processed by additional front-end circuitry. In the embodiment 100 depicted, the incoming RF signal is first processed by a wide band amplifier 102 and then passed through time delay block 104 before being processed by the sweepable bandpass filter 106. It is noted that for Nyquist sampling purposes, the sampling frequency ($f_S$) can be selected based upon the bandwidth of the sweepable bandpass filter 106 rather than the full range of the frequency band in which the input signals are operating.

It is noted that additional modifications could also be made to the architecture while still including a sweepable bandpass filter 106 in the FMCW receiver architecture, according to the present invention. As indicated above, a wideband amplifier can be utilized as an input stage, although is not required. If included, the wideband amplifier can be implemented with a bandwidth sufficient to cover the range of the potential input signals of interest. The purpose of the wideband amplifier is to improve the system noise figure and to allow for proper matching of dynamic range of the components. Additional wideband amplifiers may also be included between analog components in FIG. 1. As also indicated above, a time delay is an optional component that can be used to allow for a cued receiver system architecture. In this architecture, another receiver performs initial detection of the waveform, and the SBPF-FMCW receiver is then synchronized using this apriori or previously known information with suitable time delay.

The sweeping bandpass filter 106 can be implemented as time-varying frequency modulated bandpass filter that isolates the frequency modulated signal of interest. As indicated above, in addition to having an adjustable center frequency, the bandwidth of the filter and the shape of the filter response may also be time-varying. The ADC 108 can be controlled so as to sample the output of the sweeping filter at a sample rate based on the sweeping filter bandwidth rather than the total bandwidth of the frequency modulated signal. The digital signal processor (DSP) 110 can then be implemented to perform detection and parameter estimation. Other options include implementing bandpass demodulation that crosses one or more Nyquist zones and bandpass Kalman filtering that crosses one or more Nyquist zones. Still further, the sweeping filter control circuitry 112 can be implemented in a variety of ways. For example, the sweeping filter control circuitry 112 can provide sweeping control based solely on previously known information about the signals being received or may provide sweeping control based upon a tracking loop that tracks the frequency movements of the incoming signal. In addition, a combination of signal tracking and previously known information about the incoming signal could be used for purposes of controlling the sweep of the sweepable bandpass filter.

Other unique features can also be provided as part of the SBF receiver of present invention. For example, the use of a time-varying frequency modulated analog bandpass filter followed by bandpass sampling across one or more Nyquist zones to form a matched filter for a wideband frequency modulated signal is a feature not found in prior solutions. It is noted that bandpass sampling in the past has avoided having Nyquist boundaries (regions where the analog frequency is an integer multiple of half the sample rate) falling within the bandpass filter region because the signal cannot be fully recovered when this is the case. One key feature for the SBPF-FMCW receiver is the understanding that while the signal information right on the Nyquist boundary is not fully recoverable, the impact of the information loss with appropriate digital signal processing can be negligible for a sweeping bandpass filter because of the availability of the information before and after crossing the Nyquist boundary. This is especially true for applications such as electronic warfare (EW) where only basic parameters such as signal detection, magnitude, and frequency modulation measurement are required.

Another unique feature that may be implemented as part of the SBPF-FMCW receiver of the present invention is the combination of a time-varying frequency modulated analog bandpass filter followed by bandpass sampling across one or more Nyquist zones while utilizing a digital Kalman filter to track frequency across one or more Nyquist zones. Note that in this architecture when the signal crosses multiple Nyquist zones, the digital Kalman filter sample rate is far lower than Nyquist for the total signal bandwidth. In such an implementation, the digital Kalman filter tracks an aliased frequency modulated signal that is wrapping across multiple Nyquist zones. Still further for the case where the signal crosses multiple Nyquist zones, a time-varying frequency modulated analog bandpass filter followed by bandpass sampling across multiple Nyquist zones can be combined with a bandpass sampled (aliased) time reversed matched complex signal and low pass filter to perform digital demodulation crossing across multiple Nyquist zones in the generation of a complex envelope. In such an implementation, the complex envelope is formed from an aliased frequency modulated signal that is wrapping across multiple Nyquist zones. Once the complex envelope is generated, an optimum (for the decimated sample rate) matched filter can be formed by integrating over the sweep period or desired interval.

Advantages of the SBPF-FMCW receiver of the present invention include reduced cost, size, weight, and power (CSWAP), while retaining significant processing gain against a large variety of frequency modulated signals and high dynamic range (both spurious and linear) when compared to prior art solutions. By avoiding a compressive chirp filter, lower cost and smaller components may be used. In addition, increased dynamic range may be achieved because compressive filters typically have limited dynamic range. Also, increased flexibility is provided over fixed compressive filters because the sweeping filter may be controlled to match a wide variety of FMCW signals, including frequency modulated signals with arbitrarily large time-bandwidth product. Simplified processing is also provided over convolutional compressive filters because a waveform generator is not required. By using a narrow bandwidth sweeping filter, the sampling rate may be greatly reduced, further reducing power and allowing for higher resolution ADCs to be used.

It is again noted that the bandwidth for the swept bandpass filter of the present invention can also be time-varying. For example, operation could start out in a search mode with a wide bandwidth for the swept bandpass filter as the system looks for high SNR signals (e.g., main beam sweep across the receiver). After detection of a signal, the bandwidth for the swept BPF filter can then be narrowed in order to provide increased processing gain (in case signal strength drops). The optimum narrowing might, in fact, be determined by a Kalman filter bandwidth if a Kalman filter is being used. Other filters besides a Kalman filter could also be used as long as they were suitable for non-stationary applications. One particular implementation for a swept BPF receiver of the present invention could be a direct RF receiver with appropriate sampling technology. Thus, the bandpass filter could be swept through the RF spectrum without any up-front downconverter. It is further noted that with respect to the incoming signals, frequency modulation of the signal, for example, could include as a special case frequency shift key (i.e., frequency is constant for sections of time, then jumps).

Although a variety of digital signal processing (DSP) techniques may be used for signal detection, the DSP techniques used can be implemented to take into account the movement of the sweeping BPF across Nyquist boundaries if a slow-speed ADC is used. Although a high-speed ADC that avoids Nyquist boundaries may be used in the SBPF-FMCW receiver, much of the CSWAP benefit of the SBPF-FMCW receiver is lost. Thus, it is beneficial that the ADC utilized be sampling at a rate based only on the bandwidth of the BPF rather than the bandwidth of the frequency modulation for the incoming signal. One possibility for the DSP is to simply sum the absolute value of the real samples over the modulation period or desired subset of the modulation period. An embodiment for such an architecture is now discussed.

FIG. 2A is a block diagram for an embodiment of detection circuitry 200 that could be part of detection and DSP circuitry 110 for a swept bandpass filter FMCW receiver 100. As depicted, magnitude summation circuitry 202 receives N digital signal samples $r_k$ at time indices k from the ADC 108 and processes this digital information according to the following equation:

$$\sum_{k=0}^{N-1} |r_k|$$

The result of this summation is then provided to threshold detect and measure circuitry 204. This summed result can be used to detect the envelope of the received signal and measure it to determine if a signal has been received. The output 206 of this circuitry can then be subjected to additional processing, as desired.

The primary advantage of this detection method is that minimal digital signal processing is required. It is noted that unlike the normal envelope detector, the data is not converted to baseband in-phase/quadrature-phase (I/Q) first. Although a digital Hilbert transform may be applied to convert the data to baseband I/Q, because the frequency is time-varying across the digital bandwidth, the envelope will be time-varying as well. Thus, conversion to I/Q in this DSP scheme provides no real benefit.

Another option that provides increased processing gain is to digitally de-modulate the signal before summing the magnitudes as shown in FIG. 2B below by using a time-reversed complex matched signal to correlate with the real aliased sampled data. One key difference between this solution and prior solutions is that because the ADC is running much slower, the digital de-modulation is also running much slower and requires far less processing power to perform. It is noted that the conversion to baseband I/Q is performed by the digital de-modulation in conjunction with a low pass filter. Thus, a separate digital Hilbert transform is not required in order to generate the complex envelope of the signal. Once the complex envelope is generated, an optimum (for the decimated sample rate) matched filter can be formed by integrating over the sweep period or desired interval.

FIG. 2B is a block diagram of an embodiment for additional circuitry that could be utilized with the detection circuitry of FIG. 2A. As depicted, a digital demodulator 220 and a digital low pass filter (LPF) 222 are added in front of the summation circuitry 202. The digital demodulator 220 receives a time sweep alignment control signal 224.

An important practical consideration with the SBPF-FMCW receiver architecture is the accuracy of the apriori information or previously known information about the incoming signal. In order to reduce the sensitivity of the SBPF-FMCW receiver against errors in apriori information (such as frequency modulation), a tracking loop may be added. Alternatively, the tracking loop could be used to perform measurements such as Doppler shift. A typical tracking loop is shown below in FIG. 3 below. A number of feedback techniques are possible, depending on the system configuration.

Figure 3:
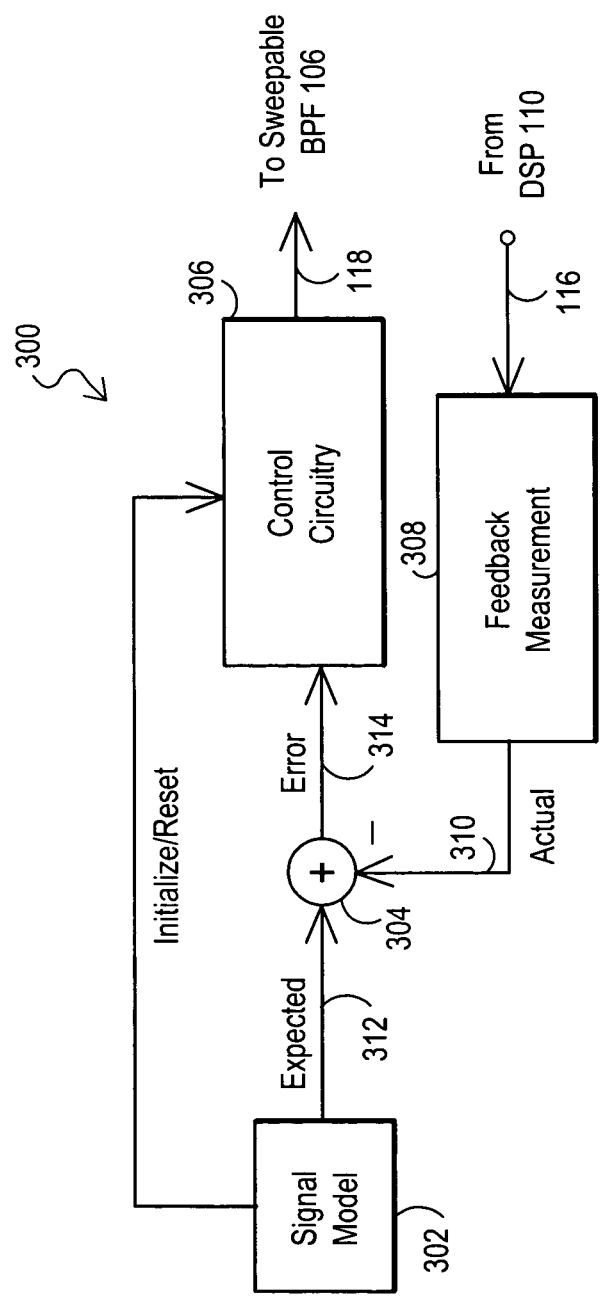
FIG. 3 is a block diagram of an embodiment for filter sweep error detection circuitry.

FIG. 3 is a block diagram of an embodiment 300 for filter sweep error detection circuitry that can be utilized as part of the filter control circuitry 112. Feedback measurement circuitry 308 receives a feedback signal from the DSP circuitry 110 through signal lines 116. The feedback measurement circuitry 308 then provides a signal (ACTUAL) 310 that represents that actual frequency of the detected signal. This signal (ACTUAL) 310 is provided as a negative input to summation block 304. Signal model circuitry 302 is configured to provide an output signal (EXPECTED) 312 that represents the expected frequency for the input signal. This signal (EXPECTED) 312 is provided as a positive input to the summation block 304. The output of summation block 304 is a signal (ERROR) 314 that represents the difference between the expected signal (EXPECTED) 312 and the actual signal (ACTUAL) 310. This difference can be an indication of induced filter sweep skew, such as may be caused by sources such as Doppler shifts and/or mismatch between the filter frequency modulation sweep and the signal frequency modulation. As an error signal, for example, the output signal (ERROR) 314 from the summation block 304 can be provided to the control circuitry 306. Control circuitry 306 can then use this error signal (ERROR) 314 in correcting or adjusting the sweep controls signals provided to the sweepable bandpass filter 106 through signal lines 118.

Figure 4:
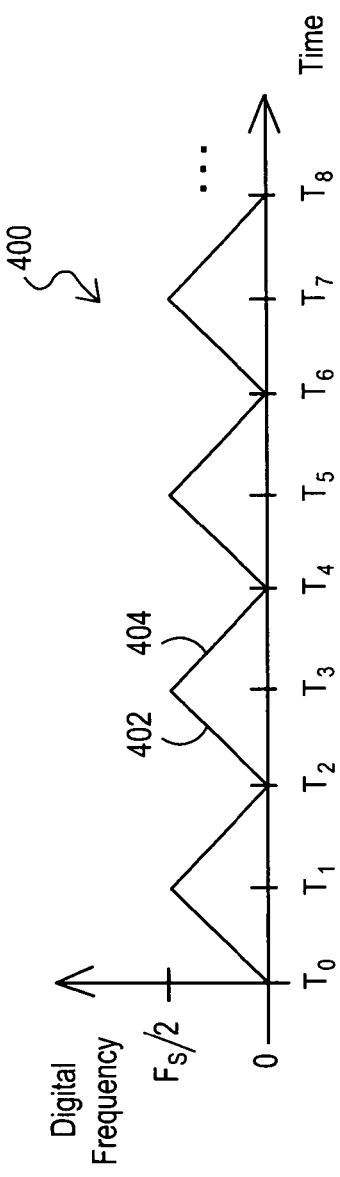
FIG. 4 is a graphical representation of a received linear chirp FMCW signal in the digital frequency domain crossing multiple Nyquist boundaries.

The digital frequency out of the ADC may be used to keep the swept BPF centered or to measure frequency deviations such as Doppler shift. Note that for constant sample rate, as the swept BPF moves through multiple Nyquist zones, the digital frequency will vary between zeros and Fs/2 (where Fs is the sample rate). One particular method of estimating frequency that is suitable for the swept BPF FMCW receiver is the Kalman filter. This is especially true if the swept BPF is moving through Nyquist zones so quickly that a good stationary approximation of the frequency is not possible. Because the samples are taken from a time-varying bandpass filter with known center frequency, the Kalman filter can be modified to provide a state correction. As the swept BPF crosses Nyquist zones and the frequency orientation reverses, the Kalman filter state can be corrected using this information to allow continuous tracking. FIG. 4 below illustrates the resulting frequency for a linear chirp in eight different Nyquist zones.

FIG. 4 is a graphical representation 400 of a received FMCW signal in the digital frequency domain. As time progresses, the received signal in the digital frequency domain moves back and forth from 0 to $F_S/2$, such as is represented by element 402, and from $F_S/2$ to 0, such as represented by element 404. Thus, as depicted, the received signal moves from 0 to $F_S/2$ during time intervals $T_0$ to $T_1$, $T_2$ to $T_3$, $T_4$ to $T_5$, $T_6$ to $T_7$, and so on. The received signal moves from $F_S/2$ to 0 during time intervals $T_1$ to $T_2$, $T_3$ to $T_4$, $T_5$ to $T_6$, $T_7$ to $T_8$, and so on. It is noted that this representation 400 assumes an incoming signal that has a carrier signal that is changing frequencies in a linear fashion as it moves through the frequency band.

It is noted that other tracking techniques may also be utilized. One such alternative tracking possibility is to use a second offset Swept BPF and track the difference between the filters. Example offset techniques include high/low filters (frequency offset measurements using two filters) and early/late filters (time offset measurements using two filters), both of which will result in a magnitude difference that can be used as a feedback to keep the swept BPF centered properly. It is further noted that multi-filter offset tracking can be combined with frequency estimation to further improve robustness against apriori error. Another tracking technique is to perform a time dither (or equivalently frequency dither) on the sweep rate (here the time dither is relative to the frequency modulation that is being tracked). It is noted that a sinusoidal dither results in an ideal real sinusoidal tracking error, which can be converted to baseband I/Q to compute the phase error (deviation from ideal tracking error signal). This phase error can be used in the feedback loop to correct the center frequency of the swept BPF.

Figure 5:
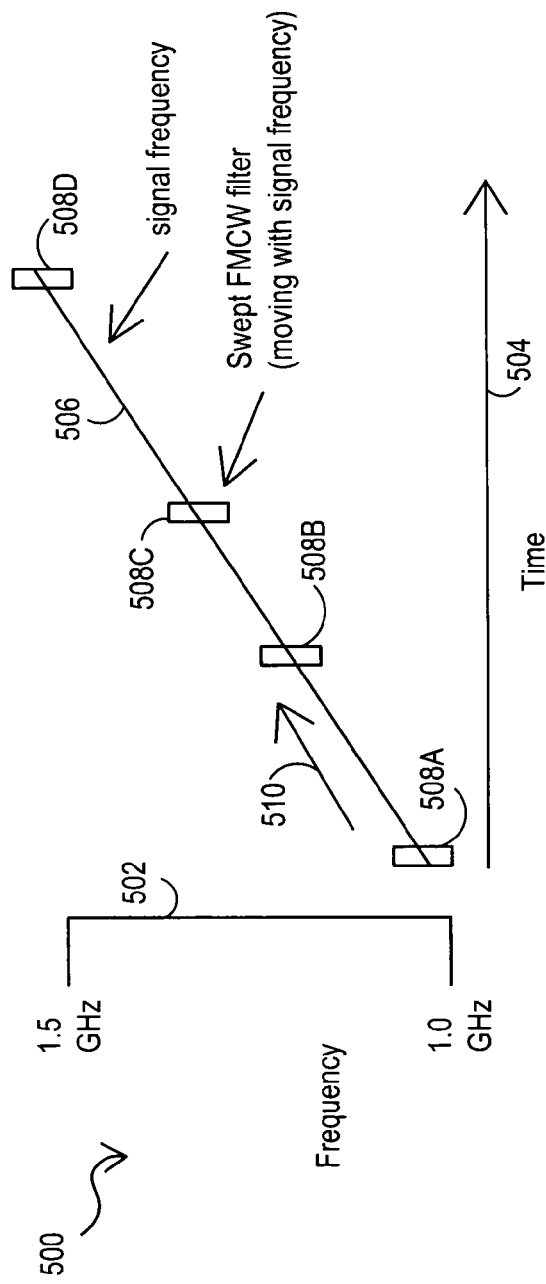
FIG. 5 is a graphical depiction of signal tracking for the center frequency of the sweepable bandpass FMCW filter according to the present invention.
Figure 6:
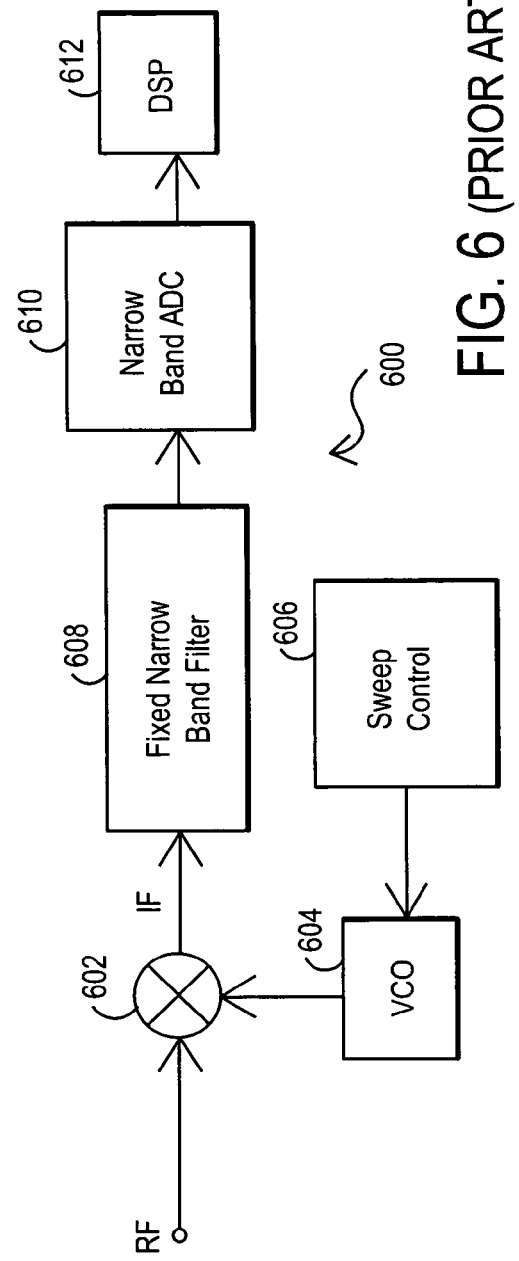
FIG. 6 (Prior Art) is a block diagram for a prior FMCW architecture that utilizes a mixer and sweep control of the voltage control oscillator (VCO) that provides the mixing signal.

FIG. 5 is a graphical depiction 500 of signal tracking for the center frequency of the sweepable bandpass FMCW filter according to the present invention. The x-axis 504 represents time, and the y-axis 502 represents the frequency of the incoming signal. For the example depicted, the signal frequency 506 is ramping from 1.0 GHz to 1.5 GHz. The vertical rectangles 508A, 508B, 508C and 508D represent the bandwidth of the sweepable bandpass filter 106 as its center frequency is swept along with the input signal frequency as its frequency changes in time. The arrow 510 represents this swept operation of the sweepable bandpass filter 106 as it tracks the input signal frequency 506. It is noted that only four points in time are represented by elements 508A, 508B, 508C and 508D. However, it is understood that the center frequency for the sweepable bandpass filter 106 can be swept along with the input signal frequency 506 at any desired rate. Thus, the center frequency may be continuously swept or may be swept at discrete intervals, as desired. It is further noted that the bandwidth of the sweepable bandpass filter 106 could also be adjusted in time, if desired, as long as the sweepable bandpass filter 106 is being swept along with the input signal frequency according to the present invention.

As indicated above for Nyquist sampling purposes, the sampling frequency ($f_S$) can be selected based upon the bandwidth of the sweepable bandpass filter 106 rather than the full range of the frequency band in which the input signals are operating. In the example embodiment 500, therefore, the sampling clock frequency ($f_S$) 114 for the ADC 108 can be selected based upon the bandwidth 508 of the swept FMCW filter 106 rather than the bandwidth or frequency range for the signal being detected, which is 500 MHz in the example depicted. For example, if the bandwidth 508 were implemented as a fixed bandwidth of 10 MHz, the sampling clock frequency ($f_S$) 114 can be selected to be above 20 MHz for Nyquist sampling purposes. This sampling rate is significantly below the 3 GHz sampling rate that would be needed for baseband Nyquist sampling and is also significantly below the 1 GHz sampling rate that would be needed for bandpass Nyquist sampling with respect to the full signal bandwidth. In one preferred embodiment, a range for the swept bandpass filter (SBPF) bandwidth is selected to be anywhere from 1% to 10% or less of the total signal bandwidth with the sample rate ($f_S$) being greater than two-times the selected filter bandwidth. Thus, the sample rate ($f_S$) based on the S bandwidth is selected to be in the range of 1% to 10% or less of what the sample rate would be if based on the total signal bandwidth. As such, and as described above, as the swept bandpass filter 106 is swept across the full frequency range of the incoming signal 506, numerous Nyquist zones, such as ten or more Nyquist zones, will be crossed.

As indicated above, Nyquist zones are determined by the sampling rate. Nyquist criteria locate sampling zone boundaries at integer (K=0, 1, 2, 3 . . . ) multiples of $f_S/2$ starting at DC (frequency=0 Hz). In addition, Nyquist zones alternate between non-inverted and inverted spectrums. Thus, in embodiment 500 as depicted in FIG. 5, assuming the filter bandwidth is fixed at 20 MHz, a Nyquist zone boundary will be crossed every 10 MHz as the swept BPF 106 moves across the signal frequency range. Even though the swept BPF architecture of the present invention is preferably used where two or more Nyquist zones are crossed during operation, it is again noted swept BPF architecture of the present invention can be utilized in implementations where one or more Nyquist zones are crossed as the filter is swept during operation. In addition, the swept BPF architecture of the present invention could also be utilized in standard bandpass Nyquist sampling with respect to the total swept bandwidth where the filter is swept within a single Nyquist zone, as well as baseband Nyquist sampling. Still further, it is also again noted that the bandwidth for the swept bandpass filter can be adjusted in time, if desired. And it is noted that the sampling frequency ($f_S$) can be adjusted in time, if desired.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. Receive path circuitry for a receiver configured to receive frequency modulated signals, comprising:
  a bandpass filter configured to receive an input signal having a frequency that varies over time within a frequency band, the bandpass filter having a bandwidth less than a bandwidth for the frequency band, having a center frequency that is sweepable across the frequency band and having a sweep control signal as an input that is configured to determine a location of the center frequency for the bandpass filter within the frequency band;
  filter sweep control circuitry coupled to the bandpass filter to provide the sweep control signal, the filter sweep control circuitry being configured to control the sweep control signal to cause the center frequency of the bandpass filter to be swept across the frequency band to track the frequency of the input signal as it varies over time within the frequency band; and
  an analog-to-digital converter (ADC) coupled to sample an output from the sweepable bandpass filter at a sampling frequency that is dependent upon a sampling clock input to the ADC.

2. The receive path circuitry of claim 1, wherein the sampling frequency is selected such that one or more Nyquist zones are crossed as the bandpass filter is swept across the frequency band.

3. The receive path circuitry of claim 1, wherein the sampling frequency is selected such that ten or more Nyquist zones are crossed as the bandpass filter is swept across the frequency band.

4. The receive path circuitry of claim 1, wherein the sampling frequency for the ADC is greater than two times the bandwidth for the sweepable bandpass filter but less than two times the bandwidth for the frequency band.

5. The receive path circuitry of claim 1, wherein the bandwidth for the sweepable bandpass filter is 1 to 10 percent of the bandwidth for the frequency band.

6. The receive path circuitry of claim 1, further comprising envelope detection circuitry coupled to receive digital signals from the ADC.

7. The receive path circuitry of claim 6, wherein the envelope detection circuitry comprises summation circuitry configured to sum a magnitude of a received signal over a plurality of digital samples from the ADC.

8. The receive path circuitry of claim 7, further comprising a digital demodulator and a digital low pass filter coupled between the ADC and the summation circuitry.

9. The receive path circuitry of claim 1, further comprising signal processing circuitry configured to further process the digital signals received from the ADC.

10. The receive path circuitry of claim 1, wherein the filter sweep control circuitry comprises error detection circuitry configured to determine a difference between an actual frequency for a received signal and an expected frequency for a received signal.

11. The receive path circuitry of claim 10, wherein the error detection circuitry comprises signal tracking circuitry that includes one or more additional sweepable filters that are offset in frequency or offset in time, or both.

12. The receive path circuitry of claim 10, wherein the error detection circuitry comprises signal tracking circuitry that utilizes a sinusoidal time dither signal.

13. The receive path circuitry of claim 1, wherein the sweepable bandpass filter is configured to have an adjustable bandwidth that is controlled by a bandwidth control signal.

14. The receive path circuitry of claim 1, wherein the input signal to be detected comprises a frequency modulated radar signal.

15. The receive path circuitry of claim 1, wherein the input signal is known to exist and its existence is being confirmed.

16. The receive path circuitry of claim 1, wherein the input signal is not known to exist and its existence is being detected.

17. A method for receiving time-variant input signals, comprising:
  receiving a input signal having a frequency that varies over time within a frequency band;
  determining a location for the input signal frequency within the frequency band as a function of time;
  sweeping the center frequency of a sweepable bandpass filter across the frequency band based upon the frequency location of the input signal to track the frequency of the input signal as it varies over time within the frequency band, the sweepable bandpass filter having a bandwidth less than a bandwidth for the frequency band;

filtering the input signal with the sweepable bandpass filter; and digitizing the filtered signal from the swept bandpass filter by sampling the output of the sweepable bandpass filter at a sampling frequency.

18. The method of claim 17, further comprising conducting additional digital signal processing on the digitized signals.

19. The method of claim 17, wherein the sampling frequency is selected such that one or more Nyquist zones are crossed as the bandpass filter is swept across the frequency band.

20. The method of claim 17, wherein the sampling frequency is selected such that ten or more Nyquist zones are crossed as the bandpass filter is swept across the frequency band.

21. The method of claim 17, further comprising determining a tracking error to help control the sweeping of the center frequency for the sweepable bandpass filter.

22. The method of claim 17, further comprising adjusting the bandwidth of the sweepable bandpass filter.

23. The method of claim 17, further comprising adjusting the sampling frequency.

24. The method of claim 17, wherein the input signal to be detected comprises a frequency modulated radar signal.

25. The method of claim 17, wherein the input signal is known to exist and its existence is being confirmed.

26. The method of claim 17, wherein the input signal is not known to exist and its existence is being detected.

* * * * *